(12) United States Patent
Bomber et al.

(10) Patent No.: US 6,199,577 B1
(45) Date of Patent: Mar. 13, 2001

(54) PRESSURE RELIEF SYSTEM FOR CHEMICAL STORAGE TANKS

(75) Inventors: Andrew J. Bomber; Michael A. Hamilton, both of Vancouver, WA (US)

(73) Assignee: SEH America, Inc., Vancouver, WA (US)

( * ) Notice: Subject to any disclaimer, the term of this patent is extended or adjusted under 35 U.S.C. 154(b) by 0 days.

(21) Appl. No.: 09/267,539

(22) Filed: Mar. 12, 1999

(51) Int. Cl.$^7$ .............................. F16K 13/10; F16K 37/00
(52) U.S. Cl. .......................................... 137/251.1; 137/559
(58) Field of Search .................................. 137/247, 247.25, 137/247.45, 247.49, 251.1, 252, 253, 559

(56) References Cited

U.S. PATENT DOCUMENTS

| | | | | |
|---|---|---|---|---|
| 883,700 | * | 4/1908 | Drager | 137/252 X |
| 1,243,604 | * | 10/1917 | Honeywell | 137/247 X |
| 1,334,457 | * | 3/1920 | Jewell | 137/247 |
| 1,730,408 | * | 10/1929 | Collins et al. | 137/251.1 |
| 2,070,204 | * | 2/1937 | Hetzer | 137/247 |
| 2,146,249 | * | 2/1939 | Clayton | 137/252 |
| 2,367,158 | * | 1/1945 | Ulm | 137/251.1 |
| 2,575,574 | * | 11/1951 | Withrow et al. | 137/251.1 |
| 2,917,071 | * | 12/1959 | Crumley et al. | 137/251.1 |
| 3,871,398 | * | 3/1975 | Finger | 137/253 |
| 3,916,948 | * | 11/1975 | Benjamin | 137/559 X |
| 4,210,174 | * | 7/1980 | Eross | 137/559 X |
| 4,411,286 | * | 10/1983 | Ball | 137/253 |
| 5,090,447 | * | 2/1992 | Lewis et al. | 137/559 |

OTHER PUBLICATIONS

Report No. CG–D–59–77, "Vent System and Loading Criteria for Avoiding Tank Overpressurization," Final Report, Sep. 1997.

"Emergency Relief Systems—Sizing and Scale–Up," Plant/Operations Progress (vol. 2, No. 1), pp. 27–30, Jan. 1983.

"Dynamic Testing and Maintenance of Safety Relief Valves," Chemical Engineering, pp. 119–124, Oct. 26, 1987.

"State–of–the–Art Review of Pressure Relief Valve Design, Testing and Modeling," Transactions of the ASME, pp. 46–54, vol. 113, Feb. 1991.

"Controlling Storage Tank Emissions," The National Environmental Journal, pp. 20–23, Jan./Feb. 1995.

Series No. P8540 FRP Conservation Breather Vent Specifications, Feb., 1997.

* cited by examiner

*Primary Examiner*—John Rivell
(74) *Attorney, Agent, or Firm*—Kolisch Hartwell Dickinson McCormack & Heuser

(57) ABSTRACT

A system for regulating pressure in a sealed chemical storage tank. The system includes a vent passage connected to the tank, through which gas may pass into and out of the tank. The vent passage includes a first enclosed region having a first volume and a second enclosed region having a second volume. A volume of liquid, which is less than each of the first and second volumes, is associated with the vent passage to selectively constrain the passage of gas through the vent passage. Increased pressure in the tank moves the liquid into the second enclosed region. The second enclosed region is constructed to accommodate the volume of liquid to allow gas to pass. Vacuum in the tank moves the liquid into the first enclosed region. The first enclosed region is constructed to accommodate the volume of liquid to allow gas to pass.

9 Claims, 2 Drawing Sheets

PRESSURE RELIEF SYSTEM FOR CHEMICAL STORAGE TANKS

TECHNICAL FIELD

The present invention is directed to chemical storage tanks, and more particularly, to an apparatus for relieving pressure variations in a sealed chemical storage tank.

BACKGROUND OF THE INVENTION

Large tanks for storing chemicals, such as acids and other liquids, are used in any situation where a large quantity of such chemical is needed for a manufacturing process. For instance, large amounts of hydrofluoric acid are used in some semiconductor manufacturing processes and are required to be stored in large tanks at a manufacturing plant. Such tanks are subject to pressure from different sources. For instance, a common method of filling a tank with fluid from a source is to place the fluid under a pressure to urge or move the fluid into the tank.

Another source of pressure is due to the injection of an inert gas, such as nitrogen, above the fluid. The nitrogen is placed in the tank at a low pressure so that the fluid does not begin to vaporize. The interior of the tank is also subject to this pressure.

Furthermore, a tank maintained in the outdoors is subject to changes in pressure due to changes in ambient temperature from exposure to sunlight and wind, etc. Changes in temperature cause the pressure inside the tank to vary according to known scientific principles. If the pressure is allowed to vary past tolerable levels, the tank may be damaged or even rupture. The pressure within a sealed tank may also change depending on the volume of liquid stored in the tank. For example, if the tank is filled with too much liquid, then the pressure may increase. If liquid in the tank is withdrawn, then pressure in the tank may decrease.

One way to accommodate pressure changes in a sealed chemical storage tank is to design a stronger tank that can withstand the pressure changes. One type of high-strength tank is made of stainless steel and is lined with a refractory such as glass. Such a tank is able to withstand wide pressure variations and is usable with many chemicals. However, some chemicals, such as hydrofluoric acid, readily react with glass, and it therefore may be necessary to store such chemicals in a tank made of reinforced polyester. This type of tank will not react with hydrofluoric acid, but the tank is not as strong as a stainless steel tank.

Another way to accommodate pressure changes in chemical storage tanks is through the use of pressure relief systems. Some such systems include internal mechanisms that are prone to failure, especially when used with tanks storing corrosive liquids. Additionally, some such systems require gas to move into and out of a tank to accommodate pressure changes. However, it may be desirable to restrict the flow of gas into and out of a tank because of chemicals or contaminants that may be in the gas.

Some systems only provide vacuum relief for a tank, such as when liquid in a tank is withdrawn creating a partial vacuum. For example, SEH America, Inc. has used a system for a number of years that includes a pipe extending from the top of a chemical storage tank down to the top of a seal pot. The seal pot is a cube-shaped box made of transparent plastic that encloses a certain volume. A pipe attached to the bottom of the seal pot extends downward from the seal pot, and then turns upward to create what may be thought of as an elbow. The pipe then extends to a gas cleaning apparatus or scrubber, and then to atmosphere. A volume of liquid is placed in the elbow of the pipe so that the liquid extends slightly up into the bottom of the seal pot. When a vacuum or decreased pressure is created in the tank, the liquid in the elbow is drawn up into the seal pot. The volume of the seal pot is greater than the volume of the liquid, so the liquid does not fill the seal pot. Because the liquid does not fill the seal pot, the liquid does not enter into the pipe extending from the top of the seal pot to the tank. Instead, when the liquid is drawn into the seal pot, gas from behind the liquid is drawn through the liquid and seal pot and into the tank, thereby regulating the pressure in the tank. When the pressure is regulated, the liquid falls back into the elbow, sealing the pipe. The seal pot, elbow and volume of liquid are sized to accommodate various pressure decreases in the tank.

The system used by SEH America, Inc., however, was designed only to accommodate vacuum relief for a tank. It did not accommodate pressure increases in a tank. In that system, pressure would build in the tank until the pressure was sufficient to force the liquid up the elbow toward the gas cleaning apparatus. That pressure, however, could damage the tank.

The present invention is a system that effectively regulates both pressure increases and vacuum in a chemical storage tank. The present invention provides an effective and cost efficient way to protect such tanks, to accommodate pressure changes in a tank, and to allow for volumetric changes of gas in a tank.

SUMMARY OF THE INVENTION

The present invention provides a system for regulating pressure in a sealed chemical storage tank. The system includes a vent passage connected to the tank, through which gas may pass into and out of the tank. The vent passage includes a first enclosed region having a first volume and a second enclosed region having a second volume. A volume of liquid, which is less than each of the first and second volumes, is associated with the vent passage to selectively constrain the passage of gas through the vent passage. Increased pressure in the tank moves the liquid into the second enclosed region, thereby effectively increasing the volume of the tank. The second enclosed region is constructed to accommodate a sufficient volume of liquid to allow for volumetric changes of gas in the tank, and also to allow gas to pass if the pressure increases significantly. Vacuum in the tank moves the liquid into the first enclosed region, effectively decreasing the volume of the tank. The first enclosed region also is constructed to accommodate a sufficient volume of liquid and to allow gas to pass. The first and second regions and the volume of liquid may be sized to regulate given pressure changes.

BRIEF DESCRIPTION OF THE DRAWINGS

FIGS. 4 through 9 show other embodiments of the invention.

DETAILED DESCRIPTION AND BEST MODE FOR CARRYING OUT THE INVENTION

Figure 1:
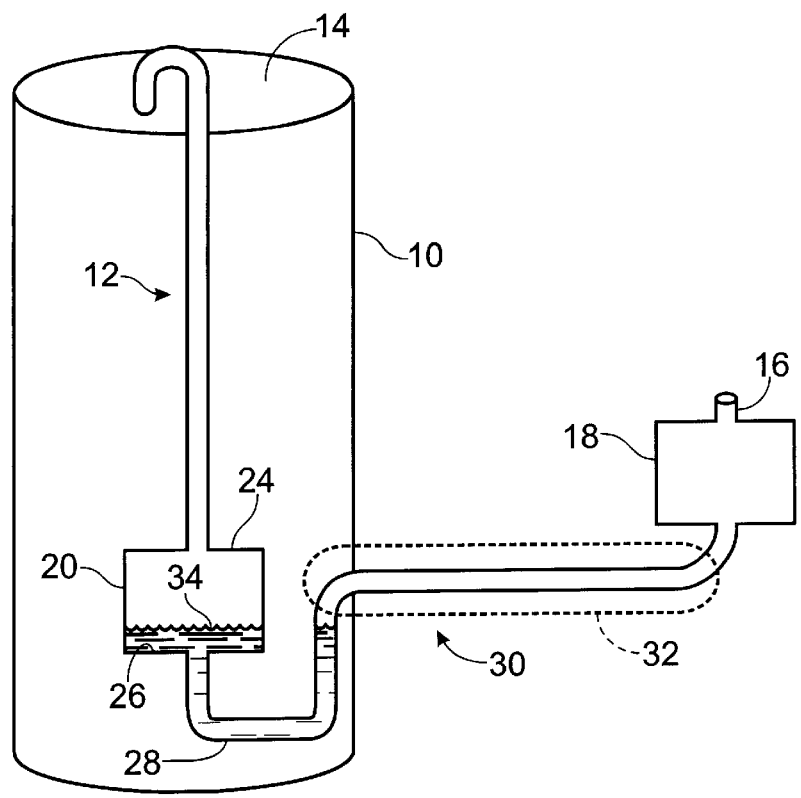
FIG. 1 is a view of an embodiment of the invention.

The invention is a system for regulating pressure changes in a sealed chemical storage tank. The system effectively maintains a substantially constant pressure in the tank by allowing the volume of gas in the tank to change. The system also allows gas to enter the tank if vacuum forms in the tank, or in other words, if the pressure in the tank decreases sufficiently, and the system allows gas in the tank to exit the tank if the pressure in the tank increases sufficiently. The system also seals the tank.

The system includes a vent passage connected to the tank, through which gas may pass into and out of the tank. The vent passage includes a first enclosed region having a first volume, and a second enclosed region having a second volume. A volume of liquid, which is less than each of the first and second volumes, is associated with the vent passage to move between the enclosed regions to accommodate volumetric changes of gas in the tank while sealing the tank. The enclosed regions and liquid may also allow gas to pass through the vent passage when necessary. Increased pressure in the tank moves the liquid into the second enclosed region, and vacuum in the tank moves the liquid into the first enclosed region.

An embodiment of the present invention may be described with reference to FIGS. 1–3. A tank for holding chemicals is shown at 10. Tank 10 may be made of reinforced polyester, stainless steel lined with glass, or other suitable material. Tank 10 is sealed and designed to hold a chemical that is used in a manufacturing process, such as hydrofluoric acid, nitric acid, ultra-pure water, or the like. An inert or non-reactive gas such as nitrogen may be introduced at a low pressure into the interior of the tank to help prevent vaporization of the chemical held by the tank. Tank 10 is sealed to prevent chemicals stored therein from escaping.

A vent passage 12 is connected to tank 10, preferably at the top 14 thereof. The vent passage is commonly a pipe or other similar conduit. Vent passage 12 extends downwardly from the top of tank 10 and to vent 16 that is open to the atmosphere. A gas cleaning apparatus, such as a scrubber 18, may be used to clean the gas before the gas is released into the atmosphere through vent 16. The actual path and length of the vent passage may vary, depending on the installation and the location of the tank relative to the scrubber.

Vent passage 12 includes a first enclosed region, shown in the figures as a seal pot 20. Seal pot 20 is a cube-shaped structure, typically constructed from a plastic, that encloses a predetermined volume. The seal pot includes a top section 24, and vent passage 12 extends from the top of tank 10 down to the top 24 of the seal pot. Seal pot 20 also has a bottom section 26, and vent passage 12 is connected to the bottom of the seal pot and then extends downward and then upward through a portion 28 of the vent passageway. Portion 28 defines a low point in vent passage, and may be thought of as an elbow. Vent passage 12 then extends beyond portion 28 to a second enclosed region 30. In the depicted embodiment, second enclosed region 30 is a substantially horizontal portion of the vent passage. The second enclosed region is configured to enclose a second volume, outlined in FIG. 1 by dashed line 32.

A volume of liquid 34, which in the illustrated embodiment is water, is placed in vent passage 12 in the low point defined by portion 28. The volume of liquid may be sufficient so that the liquid extends up into the bottom section 26 of seal pot 20. The volume of liquid 34 placed in vent passage 12 is less than each of the volume enclosed by seal pot 20, and the volume enclosed by second enclosed region 30.

When the pressure within seal pot 20 and second enclosed region 30 is constant and substantially equal, the liquid 34 remains in portion 28 of the vent passage, as shown in FIG. 1. In that situation, liquid 34 seals the tank and constrains gas from passing into or out of the tank through vent passage 12. However, when the pressure inside tank 10 decreases and at least a partial vacuum forms, such as when liquid in the tank is dispensed or when the ambient temperature around the tank decreases, the pressure in seal pot 20 also decreases. The higher relative pressure in second enclosed region 30, relative to the lower pressure in seal pot 20, will then move liquid 34 up into seal pot 20. If the vacuum in the tank is small, then only a portion of the liquid will be drawn into the seal pot and the vent passage will remain sealed. However, if a significant vacuum exists, then a sufficient amount of liquid will be drawn into seal pot 20 to permit gas to flow from second enclosed region 30 through the seal pot and into tank 10, as shown in FIG. 2. Bubbles of gas are labeled "g" in FIG. 2, and they are shown passing from second enclosed region 30 though the seal pot and into tank 10 in the direction of arrows "A". As gas enters tank 10, the pressure in the tank increases until liquid 34 is moved back down into portion 28, where the liquid again seals the passageway and the tank. Because the volume of liquid 34 is less than the volume of the seal pot, the liquid will not be drawn past the seal pot into the tank. Rather, gas will be drawn through the seal pot and into the tank.

When the pressure inside tank 10 increases, such as when the tank is filled, when the temperature around the tank increases, or when inert gas is injected into the tank as previously described, the pressure in seal pot 20 also increases. The increased pressure forces liquid 34 downwardly out of bottom section 26 of the seal pot and into portion 28 of the passageway. If the pressure increase is small, then only a portion of the liquid is forced into portion 28 and the vent passage will remain sealed. If the increased pressure is sufficiently high, then liquid 34 will be forced out of seal pot 20, through portion 28 and into second enclosed region 30, as shown in FIG. 3. Gas will then pass from tank 10 through the liquid and into second enclosed region 30, as shown by gas bubbles "g" and arrows "A" in FIG. 3, thereby relieving the increased pressure in tank 10. Once the pressure in tank 10 is sufficiently relieved, liquid 34 flows back into portion 28 to seal the passageway.

Figure 2:
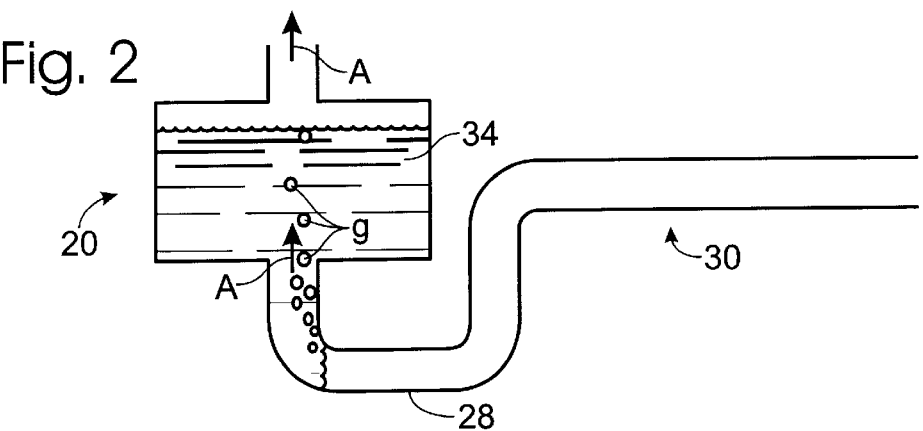
FIGS. 2 and 3 are enlarged views of a portion of FIG. 1, showing the movement of a liquid in the system.
Figure 3:
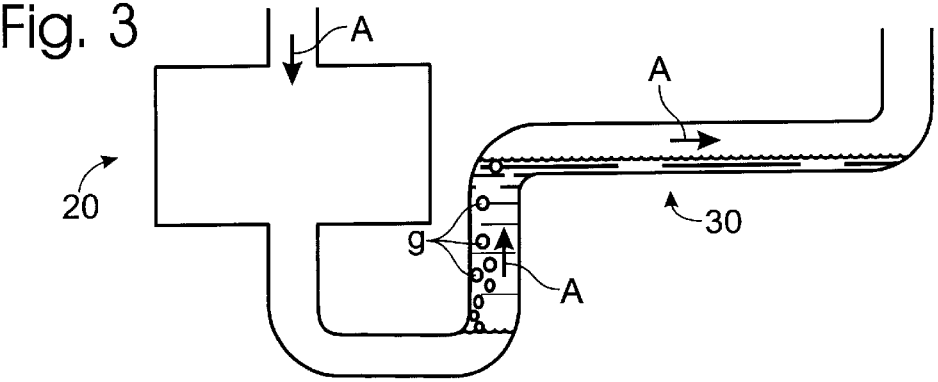

In order for the liquid to flow back into portion 28, a portion of the second enclosed region 30 shown in FIGS. 1 through 3 is horizontal. That horizontal portion allows liquid to enter along the bottom of the portion, while allowing gas to pass through the portion above the liquid, as shown in FIG. 3.

The vent passageway and seal pot shown in FIGS. 1–3 may be sized to accommodate various pressure changes. For example, the vent passageway may include a pipe made from polyvinyl chloride (PVC) and having a diameter of approximately 4 inches. The seal pot may be made from ½ inch thick sheets of PVC, and the seal pot may be a 12 inch cube. The length of the horizontal section of second enclosed region 30 should be sufficient to accommodate the volume of liquid used in the system. Often the length of the horizontal section is sufficient to enclose a volume twice that of the volume of liquid used in the system. The volume of liquid used in such a system typically is in the range of 3–10 gallons. The system may be configured to reduce the back pressure relief to less than 12 inches of water column. There should be sufficient volume and sufficient liquid to accommodate desired operating pressure ranges of gas in the tank without requiring the build up of substantial back pressure in the tank. Each enclosed region, such as seal pot 20, should be configured to have a cross-sectional area big enough so that the surface tension of liquid within the region will allow gas to pass through. If the region had a small enough cross-section, then the surface tension of liquid therein could stop gas from passing through the liquid.

In order to monitor the effectiveness of the present invention, it is often desirable to construct portions of vent passage 12 at least partially out of transparent material. Specifically, seal pot 20, connecting passage 28 and second enclosed region 30 may be constructed of clear PVC.

Figure 4:
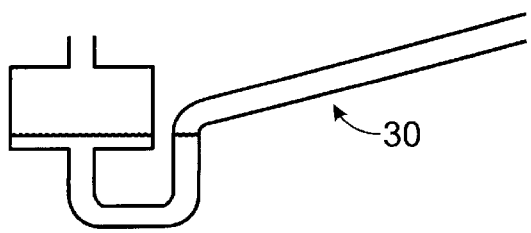
Figure 5:
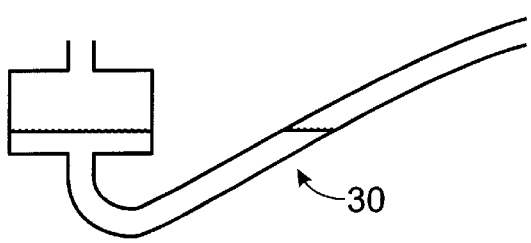
Figure 6:
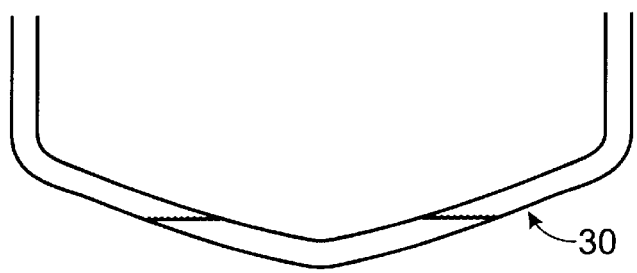
Figure 7:
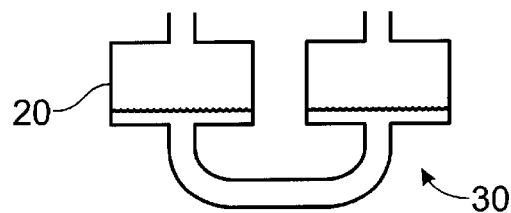
Figure 8:
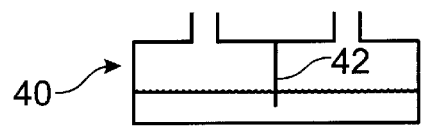

The structure of the system described above may be varied in many ways. For example, second enclosed region 30 may be inclined instead of horizontal, as shown in FIGS. 4 and 5. First and second enclosed regions may comprise sloping sections of pipe that create a shallow "V" shape, as shown in FIG. 6. Alternatively, a seal pot may be used for both the first and second enclosed regions, as shown in FIG. 7. The first and second enclosed regions may also be chambers of a single enclosure, as shown in FIG. 9, where the enclosure is shown at 40, and the first and second enclosed regions are defined by a partition 42 that permits liquid and gas to flow thereunder between the regions. Other configurations and constructions are possible.

The system also helps to prevent contaminants from entering into the storage tank by limiting the movement of gas into and out of the tank. The use of pure nitrogen as the gas in the tank, instead of air which may contain a greater amount of contaminants, also helps prevent contaminants from entering the tank. Venting the system through a gas cleaning apparatus such as a scrubber further helps prevent contaminants from entering the tank. Contaminants entering into storage tanks is a significant concern because contaminants can severely affect the use of the chemical stored in the tank.

In summary, the invention accommodates significant volumetric changes of gas in a chemical storage tank without creating significant back pressure in the tank that may damage the tank, and without having to expel gas to a scrubber or to some other gas cleaning apparatus. This is accomplished by providing a substantial volume of liquid that may be moved between enclosed regions without creating significant hydrodynamic head between the enclosed regions. The system also allows gas to pass through to accommodate significant pressure changes.

Industrial Applicability

This invention is applicable to storage of chemicals in tanks, and is particularly applicable to the storage of chemicals, such as hydrofluoric acid, ultra-pure water, and the like that are used in the manufacture of silicon semiconductor wafers.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower, or equal in scope to the original claims.

We claim:

1. A system for regulating pressure in a sealed chemical storage tank, the system comprising:

a vent passage connected to the tank, through which gas may pass into and out of the tank, where the vent passage includes
  a seal pot having a top and a bottom,
  a first pipe portion extending generally downward from the tank to the top of the seal pot,
  a second pipe portion extending from the bottom of the seal pot to a low point below the bottom of the seal pot, and then extending upward to a level higher than the bottom of the seal pot, and
  a third pipe portion extending substantially horizontally from the second pipe portion at a level higher than the bottom of the seal pot,
  where the seal pot and the third pipe portion each define a volume; and
a volume of liquid associated with the vent passage to constrain the passage of gas through the vent passage, where the volume of liquid is less than the volume of the seal pot and less than the volume of the third pipe portion;
where increased pressure in the tank moves the liquid into the substantially horizontal third pipe portion to allow gas to pass through the third pipe portion; and
where at least partial vacuum in the tank moves the liquid into the seal pot to allow gas to pass through the seal pot.

2. The system of claim 1, where the second pipe portion and the third pipe portion each has a diameter, and where the diameter of the second pipe portion is substantially equal to the diameter of the third pipe portion.

3. The system of claim 1, where the volume of the third pipe portion is at least twice the volume of the liquid.

4. The system of claim 1, where at least one of the seal pot, the second pipe portion or the third pipe portion is transparent.

5. The system of claim 1, where the seal pot, the second pipe portion and the third pipe portion are transparent.

6. The system of claim 1, where the second and third pipe portions are made from clear PVC pipe.

7. The system of claim 1, where the vent passage is connected to exhaust gas passed through the third pipe portion to a gas cleaning apparatus.

8. The system of claim 7, where the gas cleaning apparatus is disposed at a level higher than the bottom of the seal pot.

9. The system of claim 7, where the gas cleaning apparatus is disposed at a level higher than the third pipe portion.

* * * * *